A. J. ERICSSON.
CENTRIFUGAL MACHINE FOR SEPARATING SOLIDS FROM LIQUIDS.
APPLICATION FILED JULY 24, 1908.

921,814.  Patented May 18, 1909.

UNITED STATES PATENT OFFICE.

ANDERS JOHAN ERICSSON, OF STOCKSUND, STOCKHOLM, SWEDEN, ASSIGNOR TO AKTIEBOLAGET SEPARATOR, OF STOCKHOLM, SWEDEN, A COMPANY.

CENTRIFUGAL MACHINE FOR SEPARATING SOLIDS FROM LIQUIDS.

No. 921,814.  Specification of Letters Patent.  Patented May 18, 1909.

Application filed July 24, 1908. Serial No. 445,172.

*To all whom it may concern:*

Be it known that I, ANDERS JOHAN ERICSSON, a subject of the King of Sweden, residing at Stocksund, Stockholm, Sweden, civil engineer, have invented certain new and useful Improvements in Centrifugal Machines for Separating Solids from Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to centrifugal machines for separating solid matters from liquids, especially such of the nature specified in my U. S. Patents 773489, 822196, 832047 and 832048.

The present improvement more especially relates to the scraper-wheels used in those constructions for conveying the solid matters from the inner wall of the bowl to an escape opening. I have had the experience that the shovels of the rotating wheels are soon worn off, especially when sharp and hard matters are to be treated in the machine, the consequence being that the shovel wheels are soon unfit and must be replaced by new ones. This drawback is avoided by the improvement forming the object of my present invention. According to said improvement one or more of the shovels are provided with shares, scrapers or the like somewhat extending outside the rim and shovels in a radial direction. These members thus serve as protectors for the shovels and are preferably detachably connected to the same, for instance by means of screws, rivets or the like in order that they may easily be removed and replaced by others, when worn out. The protecting members serve also to loosen the solid matters deposited on the inner wall of the bowl, so that the same may be more easily caught up by the shovels of the rotating wheels.

Figure 1:
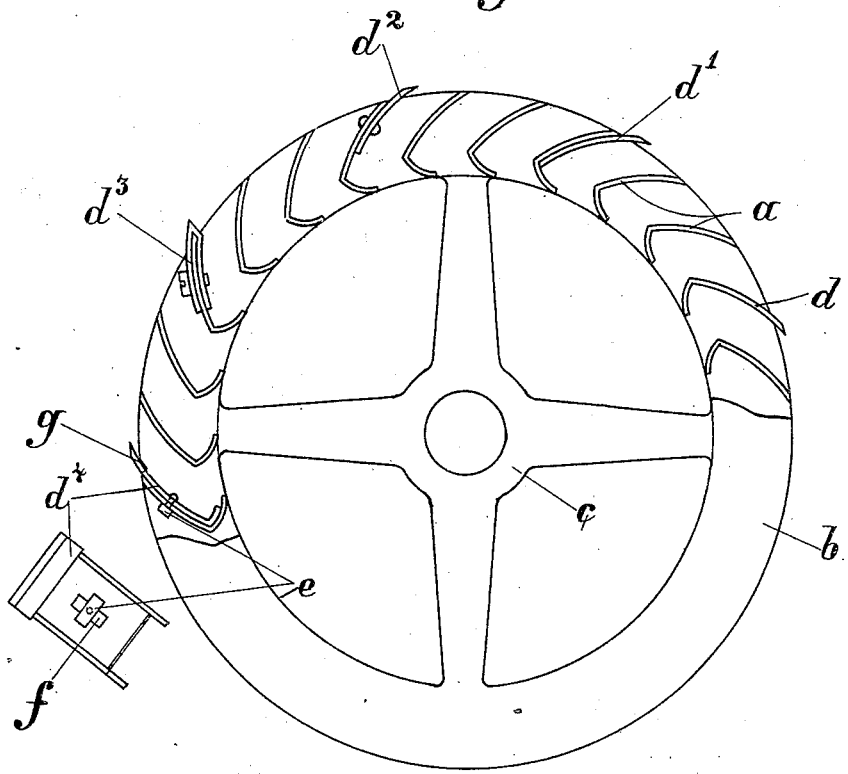
Figure 2:
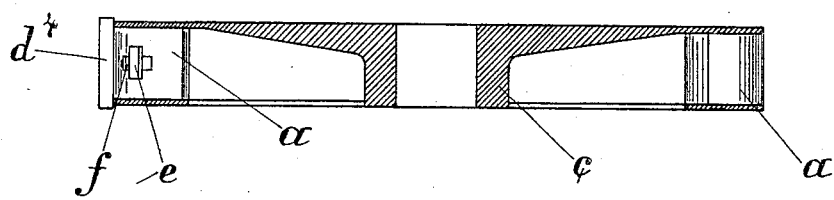

On the annexed drawing Figure 1 illustrates a shovel-wheel partly in section, showing the shovels and the protecting members attached to them. Fig. 2 is a cross section of Fig. 1.

$a$ indicates the shovels, $b$ the rim and $c$ the hub of the wheel.

$d$ is a shovel of a greater radial extension than the others. One or more such shovels may be adapted in order to protect the remaining shovels against wearing. It is, however, more useful to arrange the protecting members in the form of loosely connected scrapers, shares, shovels or the like. Four different kinds of such members are illustrated in Fig. 1. $d^1$ is a scraper somewhat extending outside the shovel and soldered to the same. $d^2$ is a scraper connected with the shovel by means of a rivet, $d^3$ shows a share connected with the shovel by means of a screw and $d^4$ is a shovel-formed scraper connected with the shovel by means of a turnable rivet with rectangular head $e$, which placed in a certain position passes through an opening $f$ in the shovel, as shown in Fig. 2 and can be detached from the same. As shown the protecting member $d^4$ is somewhat greater in cross section at its outer extremity, and the wheel rim is provided with corresponding notches $g$ (Fig. 1) in which the enlarged part enters, so that it is supported by the rim. The part of the different protecting members extending outside the rim may, if desired be toothed or formed in any suitable way.

What I claim is:

1. In a shovel-wheel, in combination, a rim, shovels connected with said wheel for conveying the solid matters in centrifugal machines, one or more shovels having a portion extending outward beyond both the rim and the remaining shovels.

2. In a shovel-wheel, shovels for conveying the solid matters in centrifugal machines, one or more of the shovels having protecting members attached thereto, said protecting members extending outward beyond both the shovels and the rim.

3. In a shovel-wheel, shovels for conveying the solid matters in centrifugal machines, one or more of the shovels having protecting members loosely attached thereto, said protecting members extending outwardly beyond the shovels and the rim.

4. In a shovel-wheel, a rim, shovels for conveying the solid matters in centrifugal machines, one or more of the shovels having protecting members, a turnable rivet with rectangular head entering a slot in the shovel for loosely attaching said protecting members to its shovel, said protecting members extending outwardly beyond the shovels and the rim.

In testimony, that I claim the foregoing as my invention, I have signed my name in presence of two subscribing witnesses.

ANDERS JOHAN ERICSSON.

Witnesses:
HARRY ALBIHN,
HJALMAR BATTERSTRÖM.